United States Patent
Naidu et al.

(10) Patent No.: US 10,337,432 B2
(45) Date of Patent: Jul. 2, 2019

(54) VEHICLE AND METHOD OF CONTROLLING A VEHICLE

(71) Applicant: FORD GLOBAL TECHNOLOGIES, LLC, Dearborn, MI (US)

(72) Inventors: Ashish Kumar Naidu, Basildon (GB);
Peter George Brittle, Romford (GB);
Frederik De Smet, Genk (BE);
Timothy Sweet, Leigh on Sea (GB);
Robert Fulbrook, Upminster (GB)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/452,134

(22) Filed: Mar. 7, 2017

(65) Prior Publication Data
US 2017/0254279 A1    Sep. 7, 2017

(30) Foreign Application Priority Data
Mar. 7, 2016    (GB) .................................. 1603914.1

(51) Int. Cl.
*F02D 41/00* (2006.01)
*B60K 6/24* (2007.10)
*B60K 6/26* (2007.10)
*B60K 6/28* (2007.10)
(Continued)

(52) U.S. Cl.
CPC ............ *F02D 41/0097* (2013.01); *B60K 6/24* (2013.01); *B60K 6/26* (2013.01); *B60K 6/28* (2013.01);
(Continued)

(58) Field of Classification Search
CPC ...... B60W 20/00; B60W 20/20; B60W 10/26; F02D 13/06; F02D 41/0087; F02D 2041/0012
See application file for complete search history.

(56) References Cited

U.S. PATENT DOCUMENTS 6,886,524 B2 * 5/2005 Hanada .................. B60K 6/485
123/198 F
6,986,399 B2    1/2006 Bhavsar et al.
(Continued)

FOREIGN PATENT DOCUMENTS

EP    1232896 A2    8/2002
EP    1388450 A2    2/2004
(Continued)

OTHER PUBLICATIONS

Extended European Search Report for European Application No. 17155172.4 dated Jul. 3, 2017.
(Continued)

*Primary Examiner* — Long T Tran
(74) *Attorney, Agent, or Firm* — David Kelley; Brooks Kushman P.C.

(57) ABSTRACT

A vehicle and method for controlling a vehicle having a variable displacement engine with an auxiliary machine connected directly to the engine crankshaft and to an energy storage device includes switching from a cylinder disablement (VDE) mode to a normal mode when the torque demand and engine speed lie outside an outer range defined by a first threshold ($T_{out}$), and switching from the normal mode to the VDE mode when the torque demand and engine speed lie within an inner range, which lies within the outer range and defined by a second threshold ($T_{in}$). When operating in a band between the two thresholds, the auxiliary machine draws energy from the energy storage device and supplements the output torque from the engine if operating (Continued)

in the VDE mode, and derives torque from the engine crankshaft to recharge the energy storage device if operating in the normal mode.

20 Claims, 2 Drawing Sheets

(51) Int. Cl.
| | |
|---|---|
| *B60K 6/485* | (2007.10) |
| *F02B 63/04* | (2006.01) |
| *F02B 67/04* | (2006.01) |
| *F02B 75/04* | (2006.01) |
| *B60W 10/08* | (2006.01) |
| *F02D 13/06* | (2006.01) |
| *F02D 17/02* | (2006.01) |
| *F02D 29/06* | (2006.01) |
| *B60K 6/48* | (2007.10) |
| *B60W 10/06* | (2006.01) |
| *B60W 20/10* | (2016.01) |
| *B60L 53/00* | (2019.01) |
| *B60L 58/12* | (2019.01) |

(52) U.S. Cl.
CPC .............. *B60K 6/48* (2013.01); *B60K 6/485* (2013.01); *B60L 53/00* (2019.02); *B60L 58/12* (2019.02); *B60W 10/06* (2013.01); *B60W 10/08* (2013.01); *B60W 20/10* (2013.01); *F02B 63/04* (2013.01); *F02B 67/04* (2013.01); *F02B 75/04* (2013.01); *F02D 13/06* (2013.01); *F02D 17/02* (2013.01); *F02D 29/06* (2013.01); *F02D 41/0087* (2013.01); *B60L 2240/423* (2013.01); *B60L 2240/54* (2013.01); *B60W 2510/06* (2013.01); *B60W 2510/244* (2013.01); *B60W 2710/083* (2013.01); *B60Y 2300/435* (2013.01); *B60Y 2300/60* (2013.01); *F02D 2200/101* (2013.01); *F02D 2200/1002* (2013.01); *F02D 2250/18* (2013.01); *F02D 2250/21* (2013.01); *F02D 2250/24* (2013.01); *Y02T 10/18* (2013.01); *Y02T 10/6221* (2013.01); *Y02T 10/6226* (2013.01); *Y02T 10/6286* (2013.01); *Y02T 10/6295* (2013.01); *Y10S 903/905* (2013.01); *Y10S 903/906* (2013.01); *Y10S 903/907* (2013.01)

(56) References Cited

U.S. PATENT DOCUMENTS

| | | | | |
|---|---|---|---|---|
| 7,040,433 | B2* | 5/2006 | Yamamoto | B60K 6/44 180/65.225 |
| 7,070,537 | B2* | 7/2006 | Polom | F02D 41/0087 477/3 |
| 7,232,401 | B2* | 6/2007 | Albertson | B60K 6/48 123/192.1 |
| 7,350,499 | B2 | 4/2008 | Takaoka et al. | |
| 7,530,413 | B2 | 5/2009 | Rayl | |
| 8,027,780 | B2* | 9/2011 | Whitney | F02D 11/105 123/436 |
| 8,214,093 | B2* | 7/2012 | Heap | B60K 6/365 701/22 |
| 8,464,690 | B2 | 6/2013 | Yuille et al. | |
| 8,660,726 | B2* | 2/2014 | Kim | B60K 6/445 701/22 |
| 8,892,330 | B2 | 11/2014 | Yuille et al. | |
| 9,005,076 | B2* | 4/2015 | Conlon | B60K 6/365 477/15 |
| 2004/0035113 | A1* | 2/2004 | Hanada | B60K 6/485 60/698 |
| 2004/0134698 | A1* | 7/2004 | Yamamoto | B60K 6/44 180/65.225 |
| 2005/0164826 | A1 | 7/2005 | Albertson | |
| 2005/0164828 | A1* | 7/2005 | Polom | F02D 41/0087 477/3 |
| 2009/0118915 | A1* | 5/2009 | Heap | B60K 6/365 701/51 |
| 2013/0066502 | A1 | 3/2013 | Yuille et al. | |
| 2013/0096759 | A1 | 4/2013 | Breton et al. | |
| 2015/0300274 | A1* | 10/2015 | Kuroki | F02D 41/0087 701/67 |

FOREIGN PATENT DOCUMENTS

| | | |
|---|---|---|
| EP | 1689993 A1 | 8/2006 |
| GB | 2361220 A | 10/2011 |

OTHER PUBLICATIONS

Auto Technology; The Honda Accord Hybrid; Vieweg Verlag, Wiesbaden, DE; vol. 6, No. spec07, Jan. 1, 2007, pp. 52-55, XP001515566, ISSN: 1616-8216.

Great Britain Search and Examination Report fo0r Great Britain Application No. GB1603914.1 dated Aug. 25, 2016.

* cited by examiner

VEHICLE AND METHOD OF CONTROLLING A VEHICLE

CROSS-REFERENCE TO RELATED APPLICATIONS

This application claims foreign priority benefits under 35 U.S.C. § 119(a)-(d) to GB Application 1603914.1 filed Mar. 7, 2016, which is hereby incorporated by reference in its entirety.

TECHNICAL FIELD

The invention relates to a method of controlling a vehicle having a drive train that comprises a variable displacement engine that is connected to drive wheels of the vehicle by way of a transmission.

BACKGROUND

The term "variable displacement engine" is used herein to refer to an engine having cylinder disablement, that is to say an engine of which one or more of the cylinders may selectively be prevented from firing and from contributing to the output power. Cylinder disablement can be performed in a variety of ways in both spark ignited and diesel engines by controlling the fueling and in some cases by also modifying the valve timing. The manner in which the displacement of the engine is varied is not of fundamental importance to the present invention and need not be described herein in detail.

When a vehicle is equipped with a variable displacement engine, there are only specific regions of the speed/load map within which it is more efficient to operate with cylinder disablement.

FIG. 1 of the accompanying drawings is a graph of engine speed versus engine torque on which there is marked out a range within which operating in a cylinder disablement (VDE) mode is more efficient. Within the range in which the VDE mode is more efficient, the fuel efficiency improvement is not constant and, as shown in FIG. 1, the improvement in efficiency reduces with increasing torque demand.

Under dynamic driving conditions, especially when the engine is operating around the threshold for the VDE deactivation mode, i.e. the perimeter of the range marked out in FIG. 1, frequent switching may occur between the VDE and normal (i.e. all cylinders firing) modes. Aside from such frequent mode changes being disconcerting to the driver, they subject the engine components to wear and affect the durability of the engine. The counter measures needed to improve robustness would have an impact on the system cost.

SUMMARY

With a view to mitigating the foregoing disadvantages by reducing the frequency of mode changing, a method of controlling a vehicle having a drive train with a variable displacement engine having a crankshaft connected to drive wheels of the vehicle by way of a transmission and an auxiliary machine connected directly to the engine crankshaft and to an energy storage device, the engine being capable of operation in a normal mode or in a cylinder disablement (VDE) depending upon the prevailing torque demand and engine speed, switches from the cylinder disablement (VDE) mode to the normal mode when the torque demand and engine speed lie outside an outer range defined by a first threshold ($T_{out}$) and from the normal mode to the VDE mode when the torque demand and engine speed lie within an inner range lying within the outer range and defined by a second threshold ($T_{in}$), and wherein, when operating within a torque demand and engine speed band between the two thresholds, the auxiliary machine draws energy from the energy storage device and supplements output torque from the engine if operating in VDE mode and derives torque from the engine crankshaft to recharge the energy storage device if the engine is operating in the normal mode.

In an embodiment, the auxiliary machine is an electric machine capable of operating selectively as a motor and a generator and the energy storage device is a battery. It should be noted however that the auxiliary machine need not be electric and may, for example, be a pump/motor connected to a compressed air cylinder serving as an energy storage device.

In contrast to the drive train architecture of most electric hybrid vehicles, the electric machine in the present invention is permanently connected to the engine crankshaft. Consequently, it cannot, and is not required to, drive the vehicle when the engine is not operating. The electric machine need only be a small compact unit comparable in size and wattage with an alternator and the battery may similarly be relatively small as it is not required to power the movement of the vehicle over any significant distance.

The function of the auxiliary machine is to match the engine torque output to a torque demand within a switching band, the inner and outer thresholds of which are designed to minimize the frequency of switching. The electric machine also enables the engine to be fueled economically within this band even though the torque demand may lie outside the operating range where VDE mode is efficient.

Advantageously, at least one of the first and second thresholds may be variable in dependence upon the state of charge of the energy storage device.

It has been proposed in various prior art references, for example U.S. Pat. No. 8,464,690, in electric hybrid vehicles having different drive train architectures to use an electric motor during changes between VDE and normal modes to smooth out the transition. Such hybrid vehicles differ from the present invention in that there is no band within which the electric machine operates constantly to match the engine torque to the torque demand.

The invention will now be described further, by way of example, with reference to the accompanying drawings, in which:

DETAILED DESCRIPTION

As required, detailed embodiments are disclosed herein; however, it is to be understood that the disclosed embodiments are merely representative and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

Figure 4:
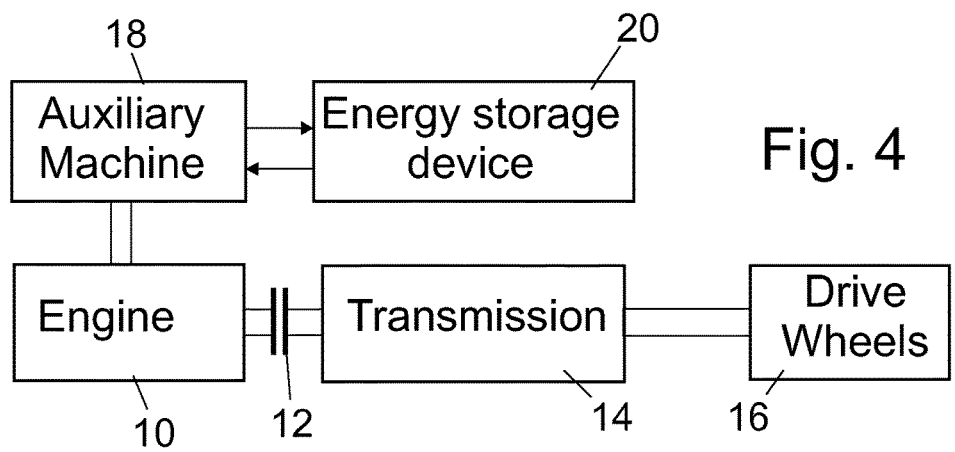
FIG. 4 shows one embodiment of a system architecture of a vehicle drive train to which the control method of the invention may be applied.

The architecture of a vehicle drive train controlled using the method of the invention is shown in FIG. 4. An engine 10 is connected by way of a clutch 12 to a transmission 14 which is in turn connected to the drive wheels 16.

In different known architectures of hybrid vehicles, an electric motor is connected to the input or the output side of the transmission downstream of the clutch 12 to enable the drive wheels to be driven by the engine, the electric motor, or a combination of the two. By contrast, embodiments of the present invention include an auxiliary machine 18 connected permanently to the engine 10, i.e. upstream of the clutch 12, so that it always turns with the engine 10 and the two cannot operate independently.

The connection between the auxiliary machine and the engine crankshaft can take place at either end of the engine to suit the packaging requirements within the engine compartment.

The invention is particularly suited to smaller engines and in FIG. 4 the engine 10 is a three-cylinder, four-stroke, spark-ignited engine of which one of the cylinders may be disabled. However, the engine may have any number of cylinders, and it may be a diesel and it may operate on a two-stroke cycle.

The method of cylinder disablement is also not of importance in the present invention, but it is desirable not to always disable the same cylinder when switching to VDE mode.

The transmission 14 may be manual or automatic and in the latter case the clutch 12 may be replaced by a torque converter.

The auxiliary machine 18 is a motor/generator connected to a battery serving as the energy storage device 20. Alternatively, it may be a compressed air pump/motor connected to a reservoir serving as an energy storage device.

Figure 1:
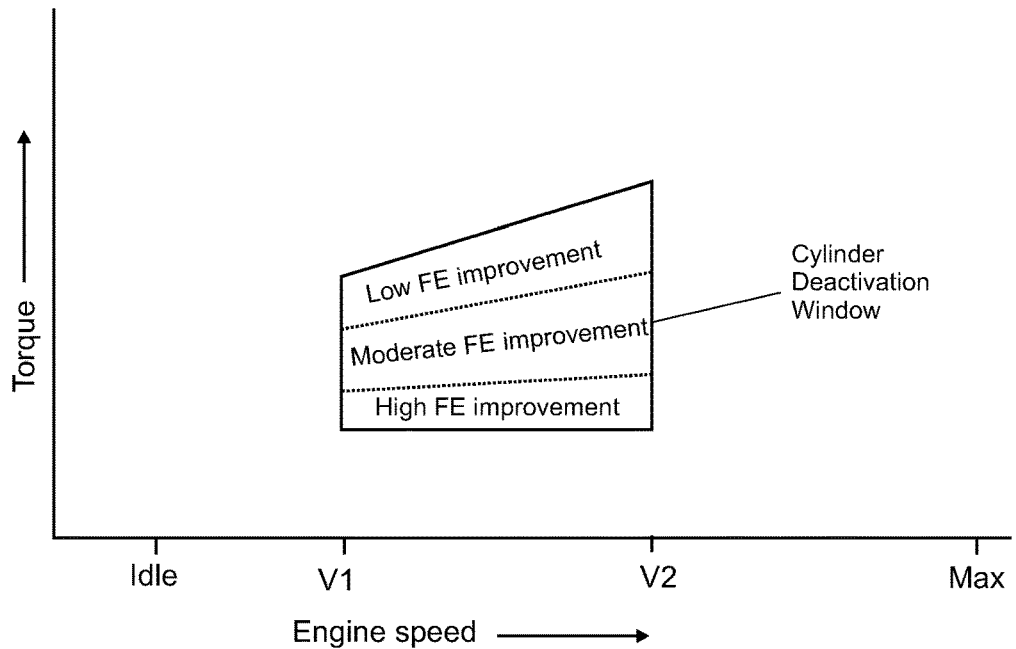
FIG. 1 is, as earlier described, a graph of engine speed versus engine output torque showing the range within which operation in the VDE mode conventionally takes place in the prior art.

In FIG. 1, there is a sharp boundary defining the VDE range and cylinder deactivation range, which is bounded by a single threshold on all sides. Whenever the vehicle is operated near the boundary of the VDE range, a small change in engine speed or torque will cause mode switching. Consequently, mode changing can take place frequently and this has undesirable NVH (noise, vibration, harshness) effects that may be disconcerting to the driver and may result in increased engine wear and reduced engine durability.

Figure 2:
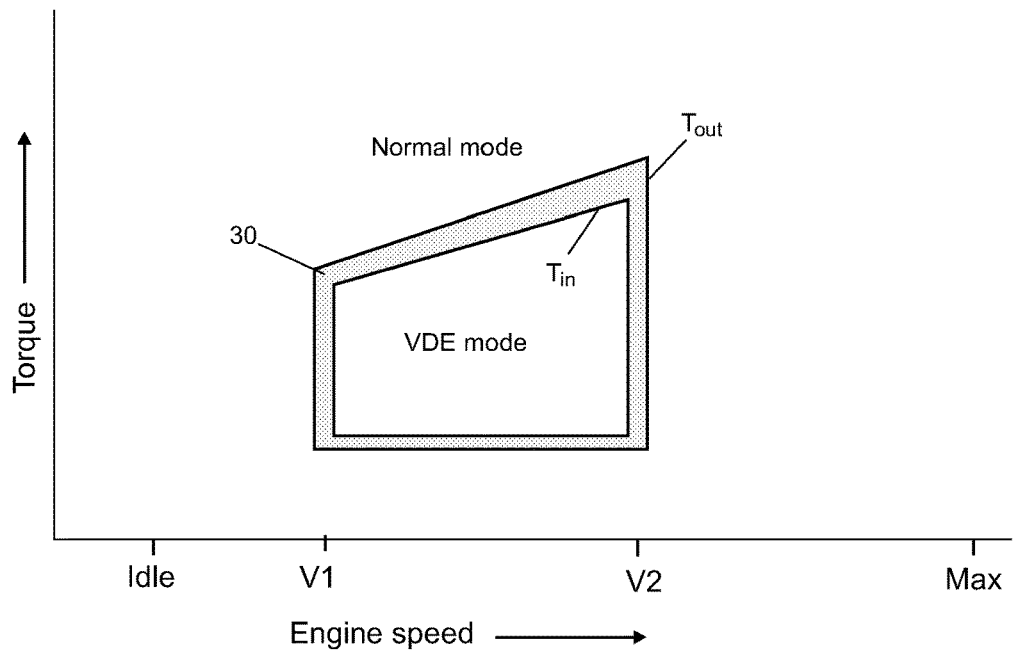
FIG. 2 is a graph similar to that of FIG. 1 illustrating the VDE mode strategy adopted by one embodiment of a method to reduce the frequency of mode switching.

To mitigate this problem, the method according to various embodiments of the present disclosure defines a band 30 that surrounds the VDE range that is shown shaded in FIG. 2 and is bounded by an inner threshold $T_{in}$ and an outer threshold $T_{out}$. A switch from VDE mode to normal mode does not take place until the engine operating point lies totally outside the band 30 and a switch to VDE mode from normal mode does not take place until the engine operating point lies inside $T_{in}$.

The transition between operating modes takes place within the band 30 within which the auxiliary machine comes into play to modify the torque applied by the engine 10 to the transmission 14.

If the engine operating point, which in normal mode, reaches the outer threshold $T_{out}$ it does not switch to VDE mode but remains in normal mode. At this time, the auxiliary machine is switched on to act as a generator. This reduces the torque transmitted to the drive wheels and at the same time recharges the battery. The engine switches to the VDE mode only when torque demand reaches the inner threshold $T_{in}$.

If now the engine operating point should again return to the band 30, the normal mode is not resumed. Instead, the auxiliary machine 18 acts as a motor and uses energy derived from the battery to supplement the output power of the engine.

By using two different thresholds, instead of only one, to determine whether or not to switch between operating modes, the invention allows the frequency of switching to be reduced considerably, the reduction in the rate of switching increasing with the width of the band. Furthermore, by supplementing the output power of the engine while in VDE mode, the method increases the range within which an efficiency improvement is obtained by cylinder deactivation.

Figure 3:
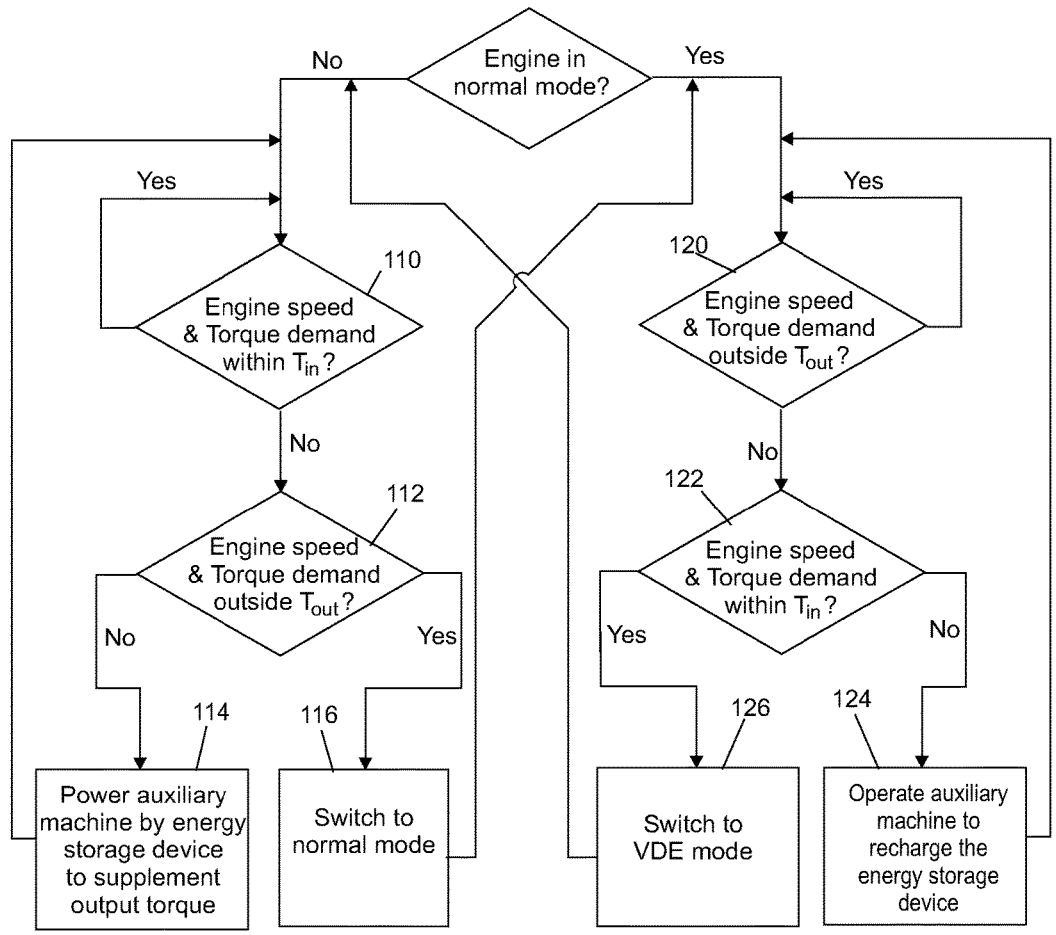
FIG. 3 is a flow chart showing an embodiment of a control method to reduce VDE mode switching frequency.

The method is further explained by the flow chart of FIG. 3 which shows the decisions taken by a software program to determine the engine mode of operating and whether the auxiliary machine functions as a motor or a generator.

As can be seen, the flow chart is symmetrical about a center line with the left side representing operation in VDE mode and the right side the operation in the normal mode.

Assuming that the engine is operating in VDE mode, it is first determined in decision block 110 is the engine operating point is within the threshold $T_{in}$. The illustrated boundary $T_{in}$ can be defined by four vectors and in this case whether or not an operating point lies within the boundary can be determined using simple mathematical algorithms. However, the VDE range can have any desired irregular shape, determined empirically, in which case a two-dimensional look-up table may be used to determine whether or not an engine operating point lies within $T_{in}$.

If the operating point is determined in decision block 112 to have crossed the threshold $T_{in}$, then a further decision is taken in block 112 to determine if the operating point lies within the band 30, i.e. the threshold $T_{out}$ has not yet been exceeded. If this is the case, the cylinder deactivation mode is retained but in block 114 the auxiliary machine 118 is operated as a motor to supplement the engine output power.

If it is determined in block 112 that the threshold $T_{out}$ has also been surpassed, then and only then does the control system instruct the engine in block 116 to revert to the normal mode.

When the engine is operating in normal mode on the right hand side of the flow chart, and it approaches the VDE range from any direction, the first threshold to be crossed would be the threshold $T_{out}$. This is determined in the decision block 120.

After it has been determined that the outer threshold $T_{out}$ has been crossed, the decision block 122 determines if the engine is operating within the band 30 or within the inner threshold $T_{in}$. If operating with the band 30, the auxiliary machine is switched on as a generator in block 124 to charge the battery and reduce the power transmitted to the driven wheels. When eventually the inner threshold $T_{in}$ is crossed, the control system instructs the engine in block 126 to change to the VDE mode.

While representative embodiments are described above, it is not intended that these embodiments describe all possible forms of the claimed subject matter. The words used in the specification are words of description rather than limitation, and it is understood that various changes may be made without departing from the spirit and scope of the claimed subject matter. Additionally, the features of various implementing embodiments may be combined to form further embodiments that may not be explicitly described or illustrated.

What is claimed is:

1. A method for controlling a vehicle having an engine operable in a variable displacement (VDE) mode and an auxiliary device connected directly to a crankshaft of the engine and coupled to an energy storage device, comprising:
   operating the auxiliary device to store energy in the energy storage device responsive to operating the engine in a normal mode when engine speed and torque demand fall within a first VDE speed and torque boundary but outside a second VDE speed and torque boundary, the second VDE speed and torque boundary being contained within the first VDE speed and torque boundary; and
   operating the auxiliary device powered by the energy storage device to supply torque to the crankshaft responsive to operating in the VDE mode when engine speed and torque demand exceed the second VDE speed and torque boundary but are within the first VDE speed and torque boundary.

2. The method of claim 1 wherein at least one of the first and second VDE speed and torque boundaries varies depending on a state of energy storage of the energy storage device.

3. The method of claim 1 further comprising:
   switching engine operation from the normal mode to the VDE mode in response to engine speed and torque demand moving within the second VDE speed and torque boundary.

4. The method of claim 1 further comprising:
   switching engine operation from the VDE mode to the normal mode in response to engine speed and torque demand moving outside the first VDE speed and torque boundary.

5. The method of claim 1 wherein the auxiliary device comprises an electric machine and the energy storage device comprises a battery, wherein the method comprises operating the electric machine as a generator to store energy in the battery.

6. The method of claim 5 wherein the method comprises operating the electric machine as a motor powered by the battery to supply the torque to the crankshaft.

7. The method of claim 1 wherein operating the engine in the VDE mode comprises disabling at least one cylinder of the engine.

8. A method for controlling a vehicle having an engine operable in a variable displacement (VDE) mode, comprising:
   when operating in the VDE mode, supplying torque from an auxiliary device responsive to engine speed and torque demand being between first and second speed and torque boundaries, the second boundary containing the first boundary; and
   when operating in normal mode, storing energy from the auxiliary device responsive to the demand being between the first and second boundaries.

9. The method of claim 8 wherein supplying torque from the auxiliary device comprises controlling an electric machine to operate as a motor powered by a battery.

10. The method of claim 8 wherein storing energy from the auxiliary device comprises controlling an electric machine to operate as a generator to store energy in a battery.

11. The method of claim 8 wherein the first and second speed and torque boundaries vary in response to a state of energy storage of the auxiliary device.

12. The method of claim 8 further comprising controlling the engine to switch from the VDE mode to the normal mode in response to the engine speed and torque demand moving outside the second speed and torque boundary.

13. The method of claim 8 further comprising controlling the engine to switch from the normal mode to the VDE mode in response to the engine speed and torque demand moving inside the first speed and torque boundary.

14. The method of claim 8 wherein the auxiliary device is directly attached to a crankshaft of the engine.

15. A vehicle comprising:
   an engine operable in a variable displacement (VDE) mode;
   an auxiliary device directly coupled to a crankshaft of the engine;
   a controller configured to operate the auxiliary device to supply torque to the crankshaft when the engine is operating in the VDE mode responsive to engine speed and torque demand being between first and second speed and torque boundaries, wherein the first boundary is contained within the second boundary.

16. The vehicle of claim 15 wherein the controller is further configured to operate the auxiliary device to store energy in an energy storage device when the engine is operating in a normal mode responsive to engine speed and torque demand being between the first and second speed and torque boundaries.

17. The vehicle of claim 16 wherein the auxiliary device comprises an electric machine.

18. The vehicle of claim 17 wherein the energy storage device comprises a battery.

19. The vehicle of claim 16 wherein the auxiliary device comprises an electric machine, the energy storage device comprises a battery, and wherein the first and second boundaries vary in accordance with a state of charge of the battery.

20. The vehicle of claim 16 wherein the controller is further configured to:
   switch from the VDE mode to the normal mode in response to the engine speed and torque demand moving outside the second speed and torque boundary; and
   switch from the normal mode to the VDE mode in response to the engine speed and torque demand moving inside the first speed and torque boundary.

* * * * *